Patented Aug. 28, 1934

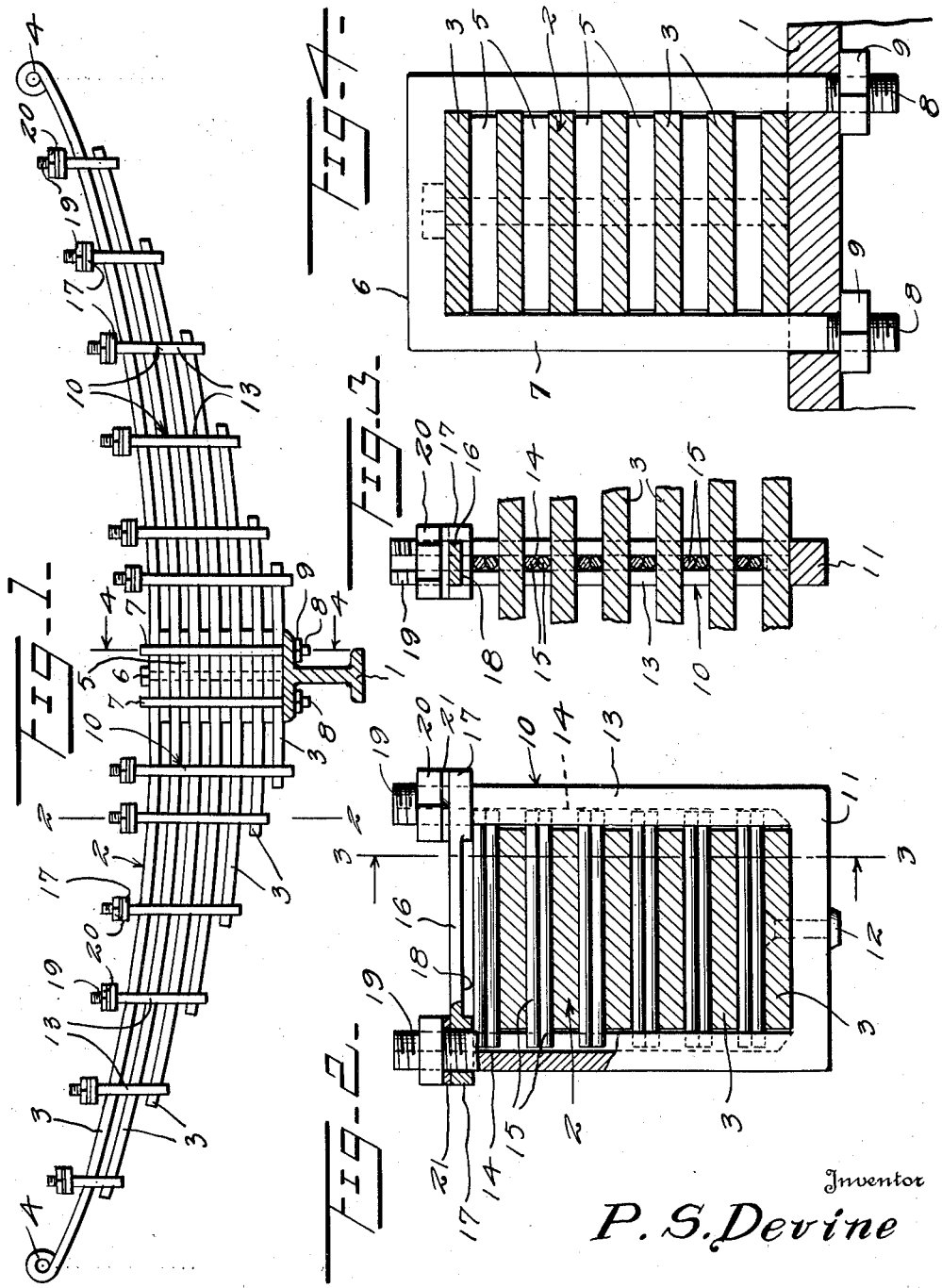
Aug. 28, 1934.    P. S. DEVINE    1,971,709
VEHICLE SPRING
Filed May 29, 1933

1,971,709

UNITED STATES PATENT OFFICE 1,971,709

VEHICLE SPRING

Patrick S. Devine, Pharr, Tex.

Application May 29, 1933, Serial No. 673,523

7 Claims. (Cl. 267—49)

This invention relates to improvements in springs and pertains particularly to leaf springs of the elliptic or semi-elliptic type used principally upon motor vehicles.

The primary object of the present invention is to provide a leaf spring in which anti-friction elements are interposed in a novel manner between the leaves thereof so as to facilitate relative movement between the same.

Still another object of the invention is to provide a leaf spring structure wherein the relative movement between the leaves as the latter are flexed, is permitted to take place with the least amount of friction by the interpositioning of pairs of anti-friction elements therebetween.

Still another object of the invention is to provide a leaf spring structure having anti-friction elements disposed between the leaves thereof, in which novel means is employed for mounting and retaining these elements in operative position.

Other objects and advantages of the invention will become apparent as the description of the same proceeds and the invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in side elevation of the spring embodying the present invention;

Figure 2 is a sectional view taken on the line 2—2 of Figure 1;

Figure 3 is a sectional view taken on the line 3—3 of Figure 2;

Figure 4 is a sectional view taken on the line 4—4 of Figure 1, the spring leaves only being in section.

Referring now more particularly to the drawing wherein like numerals of reference indicate corresponding parts throughout the several views, the numeral 1 indicates generally a support for a spring of the semi-elliptic type constructed in accordance with the present invention. This member 1 may represent an axle of a motor vehicle, a beam of a railway car truck or other support upon which such a spring might be mounted.

The spring as a whole is indicated by the numeral 2 and is made up of the usual leaves 3, the top one of which is formed to provide or has integrally connected therewith, the eyes 4 at the ends by which connection is made with the usual shackle elements (not shown).

The leaves 3 are held in spaced relation by the interposed separating or spacer plates 5 which extend over a relatively small area at the center of the spring structure and above the supporting base 1. The leaves and these separator plates are secured together by the central bolt 6 and upon either side of this bolt is an inverted U-bolt 7 which straddles the spring body and has its threaded ends 8 extending through the underlying supporting beam 1 in the manner illustrated and carrying the nuts 9 by which the bolts are drawn to position.

At spaced intervals upon either side of the center of the spring structure, are the modified U-bolts 10, there being, preferably, one of these modified U-bolts at each end of each spring leaf. As shown, these modified U-bolts are upright and the head portion 11 of each is riveted to the lowermost adjacent leaf, by the rivet 12.

The modified U-bolts 10 have the opposing faces of the legs 13 thereof provided with the channels 14 and disposed in these channels are the ends of pairs of roller pins 15. These roller pins are disposed in pairs between the spring leaves as shown in Figure 3 and the topmost leaf has a pair of the pins thereover, the lower one of which is in engagement therewith, while the upper one is engaged by a clamp bar 16 which extends longitudinally of the pins and has at its ends the eyes 17 through which the free ends of the clamp legs 13 pass. These clamp bars 16 engage the underlying roller pin only at the ends, the central portion of the bar being cut away as indicated at 18. The free ends of the legs 13 of the modified U-bolts are threaded as at 19 to receive the nuts 20 and interposed between each nut and the underlying clamp bar eye 17 is a lock washer 21 which operates to prevent the nut working loose.

It will be seen that the pairs of roller pins are disposed one above the other between the spring leaves so that each pin of each pair which is located between two leaves engages a leaf and they also engage one another. The topmost pairs of roller pins have one roller engaging the top spring leaf and the other in engagement with the eyes of an overlying clamp bar 16. It will thus be apparent that as the spring is flexed and the leaves move relative to one another the pins will roll upon one another and the freest amount of movement possible will be permitted between the leaves and between the topmost leaf and the transverse bar members of the U-bolts.

It will also be apparent that upon rebound the elements of the spring cannot separate or move out of contact with one another and, therefore, there will be no rattle or noise incident to the use of the spring.

Having thus described the invention, what is claimed is:—

1. A spring structure, comprising a plurality of superposed leaves, means for coupling the leaves together to form a unitary structure, and a pair of superposed contacting roller elements interposed between each confronting pair of leaf faces.

2. A spring, comprising a plurality of superposed leaves, spacing elements between the leaves, means securing the spacing elements and leaves together, a plurality of U-bolts disposed in spaced relation about said leaves, each of said bolts having opposed portions provided with channels extending transversely of the leaves, and a plurality of pairs of roller pins extending transversely of the leaves and having their ends disposed in the channels of the U-bolts, each two confronting faces of a pair of leaves having a pair of said pins disposed therebetween.

3. A spring structure, comprising a plurality of superposed leaves, a plurality of U-bolts surrounding said leaves at spaced intervals, each of said U-bolts having the side portions thereof provided with opposing channels, a bar connecting the ends of each of said U-bolts and extending across a leaf, and a plurality of pairs of roller pins connecting the sides of each U-bolt and having their ends disposed in said channels, each pair of spring leaves having the confronting faces separated by a pair of said roller pins and the uppermost one of said spring leaves being spaced from the overlying connecting bars of the U-bolts by a pair of roller pins.

4. In a spring structure, a plurality of superposed leaves, means at the transverse center of said leaves for securing the same together, spacing elements between said leaves at the central portion thereof, substantially U-shaped shackle elements having parallel side arms and receiving said leaves therebetween, said side arms having longitudinally extending grooves in the opposed faces thereof, roller elements disposed between the arms of each shackle and having slidable end engagement in said grooves, said roller elements being in pairs and each pair being interposed between opposed surfaces of the leaves and each element of each pair engaging one of said surfaces, and yoke members connecting the free ends of the shackle arms and engaging and retaining the roller elements in position relative to an adjacent spring face.

5. In a spring structure, a plurality of superposed leaves, means securing said leaves together at the centers thereof, a plurality of pairs of contacting superposed cylindrical rollers interposed between each confronting pair of leaf surfaces, and means connecting said pairs of rollers together in groups spaced vertically by interposed leaves.

6. In a spring structure, a plurality of superposed leaves, means securing said leaves together at the centers thereof, a plurality of pairs of contacting superposed cylindrical rollers interposed between each confronting pair of leaf surfaces, and means connecting said pairs of rollers together in groups spaced vertically by interposed leaves, each of said last means being secured to a leaf and held against movement relative to the same.

7. In a spring structure, a plurality of superposed leaves, means securing said leaves together at the centers thereof, a plurality of pairs of contacting superposed cylindrical rollers interposed between each confronting pair of leaf surfaces, means connecting said pairs of rollers together in groups spaced vertically by interposed leaves, a plurality of pairs of superposed contacting rollers overlying the topmost leaf, and said connecting means engaging and maintaining the last mentioned pairs of rollers in position.

PATRICK S. DEVINE.